US009126325B1

(12) United States Patent
Meacham et al.

(10) Patent No.: US 9,126,325 B1
(45) Date of Patent: Sep. 8, 2015

(54) RAILCAR MAINTENANCE CREEPER

(71) Applicants: William Shane Meacham, Myrtle Beach, SC (US); William W. Just, Florence, SC (US)

(72) Inventors: William Shane Meacham, Myrtle Beach, SC (US); William W. Just, Florence, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 0 days.

(21) Appl. No.: 14/018,007

(22) Filed: Sep. 4, 2013

Related U.S. Application Data

(62) Division of application No. 12/868,098, filed on Aug. 25, 2010, now Pat. No. 8,573,607.

(51) Int. Cl.
*B62B 11/00* (2006.01)
*B25H 5/00* (2006.01)

(52) U.S. Cl.
CPC ........................................ *B25H 5/00* (2013.01)

(58) Field of Classification Search
USPC ........................................................ 280/32.6
See application file for complete search history.

(56) References Cited

U.S. PATENT DOCUMENTS 2,611,417 A 12/1946 Henry et al.
3,976,155 A 8/1976 Esch
4,181,463 A 1/1980 Mooney
4,185,846 A * 1/1980 Black ........................... 280/32.6
4,895,380 A 1/1990 Brooks et al.
5,330,211 A 7/1994 Nicholson
5,472,219 A * 12/1995 Eckstrum ..................... 280/32.6
5,503,415 A 4/1996 Powell
RE35,732 E * 2/1998 Shockley ................. 296/136.07
5,730,449 A * 3/1998 Miles ........................... 280/32.6
5,863,053 A * 1/1999 Berry ........................... 280/32.6
5,897,122 A 4/1999 Borner
6,024,376 A * 2/2000 Golichowski et al. ..... 280/655.1
6,076,838 A * 6/2000 Peterson et al. ............. 280/32.6
6,302,413 B1 10/2001 Comeaux
6,361,111 B1 3/2002 Bowers et al.
6,398,234 B1 6/2002 Brown
6,425,590 B1 * 7/2002 Whiteside et al. ........... 280/32.6
6,578,857 B1 6/2003 Whiteside et al.
6,578,859 B2 6/2003 Chen
6,641,146 B2 * 11/2003 Reese .......................... 280/32.6
6,702,305 B2 * 3/2004 Miles ........................... 280/32.6
6,733,073 B2 5/2004 Whiteside et al.
6,857,644 B2 2/2005 Hsiao
6,969,077 B2 11/2005 Liu
7,070,189 B2 * 7/2006 Grauss ......................... 280/32.6
7,070,241 B2 7/2006 Saulnier et al.
7,188,843 B2 3/2007 Magness
7,237,781 B2 7/2007 Canova
7,363,864 B2 * 4/2008 Broek ........................... 104/106
(Continued)

*Primary Examiner* — Jeffrey J Restifo
(74) *Attorney, Agent, or Firm* — Amy Allen Hinson; John B. Hardaway, III; Nexsen Pruet, LLC

(57) ABSTRACT

A creeper is provided wherein the creeper has a main frame comprising a front and a rear; wheels attached to the main frame; a handle attached to the mainframe rearward of said wheels; a platform slidably attached to the main frame and rail engagement brackets attached to the mainframe forward of the wheels. Pressure is applied to the handle thereby lifting the front of the main frame thereby supporting the creeper on the wheels. The creeper is moved to a position under the railcar. Pressure is removed from the handle thereby allowing the front of the creeper to lower wherein the rail engagement brackets engage with rails of a track. The personnel lays on the platform and slides the platform under the railcar.

11 Claims, 4 Drawing Sheets

(56) References Cited

U.S. PATENT DOCUMENTS

| | | | | |
|---|---|---|---|---|
| 7,374,181 | B1 * | 5/2008 | Wu | 280/32.6 |
| 7,694,630 | B2 | 4/2010 | Straub et al. | |
| 7,743,710 | B2 | 6/2010 | Gordon | |
| 8,002,289 | B2 | 8/2011 | Diaz | |
| 8,056,908 | B2 * | 11/2011 | Scott | 280/32.6 |
| 8,573,607 | B2 | 11/2013 | Meacham et al. | |
| 8,590,907 | B2 | 11/2013 | Hurt et al. | |
| 8,596,651 | B2 | 12/2013 | Canova | |
| 2001/0025740 | A1 | 10/2001 | Ehnes | |
| 2002/0125662 | A1 * | 9/2002 | Magness | 280/30 |
| 2003/0168824 | A1 * | 9/2003 | Miles | 280/32.6 |
| 2005/0098966 | A1 | 5/2005 | Canova | |
| 2006/0186619 | A1 | 8/2006 | Sieb et al. | |
| 2007/0235960 | A1 * | 10/2007 | Pantaleoni | 280/32.6 |
| 2011/0227303 | A1 * | 9/2011 | Gering | 280/32.6 |
| 2012/0038122 | A1 | 2/2012 | Canova | |
| 2012/0049471 | A1 * | 3/2012 | Meacham et al. | 280/32.6 |
| 2012/0091673 | A1 * | 4/2012 | Meacham et al. | 280/32.6 |
| 2012/0235371 | A1 | 9/2012 | Smith | |

* cited by examiner

RAILCAR MAINTENANCE CREEPER

BACKGROUND

The present invention is related to an improved creeper for use in the repair and maintenance of railcars. More specifically, the present invention is related to an improved creeper which allows easy, and safe, transit under a railcar.

Railcar maintenance is an ongoing activity. In general, a railcar comprises a frame on an undercarriage with some type of cargo holding element, such as a flat bed or a superstructure, on the frame. Superstructures extend above the frame and are configured to carry some form of cargo. Superstructures include various carrier devices such as container boxes, car carriers, chemical containers, grain containers, livestock containers and the like without limit thereto.

The undercarriage includes the wheel assembly and operational systems such as braking, which may be considered part of the wheel assembly, hydraulics, communication links, etc. Due to the large number of components associated with the undercarriage, or below the frame, there is a constant need for maintenance personnel to work under the railcar. There are inherent dangers associated with personnel working under a railcar. Due to the overhead height the personnel must crawl, bend over, or walk in a squatted fashion to reach access to the underside of the railcar. This is obviously in conflict with good ergonomic practice and uncomfortable to the personnel. It is not uncommon for the personnel to stand up, either accidentally or in response to discomfort, which may cause contact between the personnel and the railcar.

There has been an ongoing need for a creeper which is specifically suited for use under a railcar.

SUMMARY

It is an object of the invention to provide a creeper specifically designed for use under a rail car.

It is another object of the invention to provide a work platform for use under a rail car which allows the maintenance personnel freedom to move without the encumbrances associated with a confined overhead space.

A particular feature of the invention is the versatility associated with a rotational and translatable seat.

These and other advantages, as will be realized, are provided in a creeper particularly adapted for operation under a railcar. The creeper has a main frame comprising a front and a rear. Wheels and a handle are attached to the main frame. The handle is attached to the mainframe rearward of the wheels. A platform is slidably attached to the main frame. Rail engagement brackets are attached to the mainframe forward of the wheels.

Yet another embodiment is provided in a method for accessing an undercarriage on a railcar. A creeper is provided wherein the creeper has a main frame comprising a front and a rear; wheels attached to the main frame; a handle attached to the mainframe rearward of said wheels; a platform slidably attached to the main frame and rail engagement brackets attached to the mainframe forward of the wheels. Pressure is applied to the handle thereby lifting the front of the main frame thereby supporting the creeper on the wheels. The creeper is moved to a position under the railcar. Pressure is removed from the handle thereby allowing the front of the creeper to lower wherein the rail engagement brackets engage with rails of a track. The personnel lays on the platform and slides the platform under the railcar.

DESCRIPTION OF REPRESENTATIVE EMBODIMENTS

The present invention is directed to a railcar maintenance creeper which is particularly suited for use under the undercarriage of a railcar. More specifically, the creeper engages with the track to secure the position thereof.

Embodiments of the invention will be described with reference to the figures which form an integral, non-limiting, part of the application. Throughout the various figures similar elements will be numbered accordingly.

Figure 1:
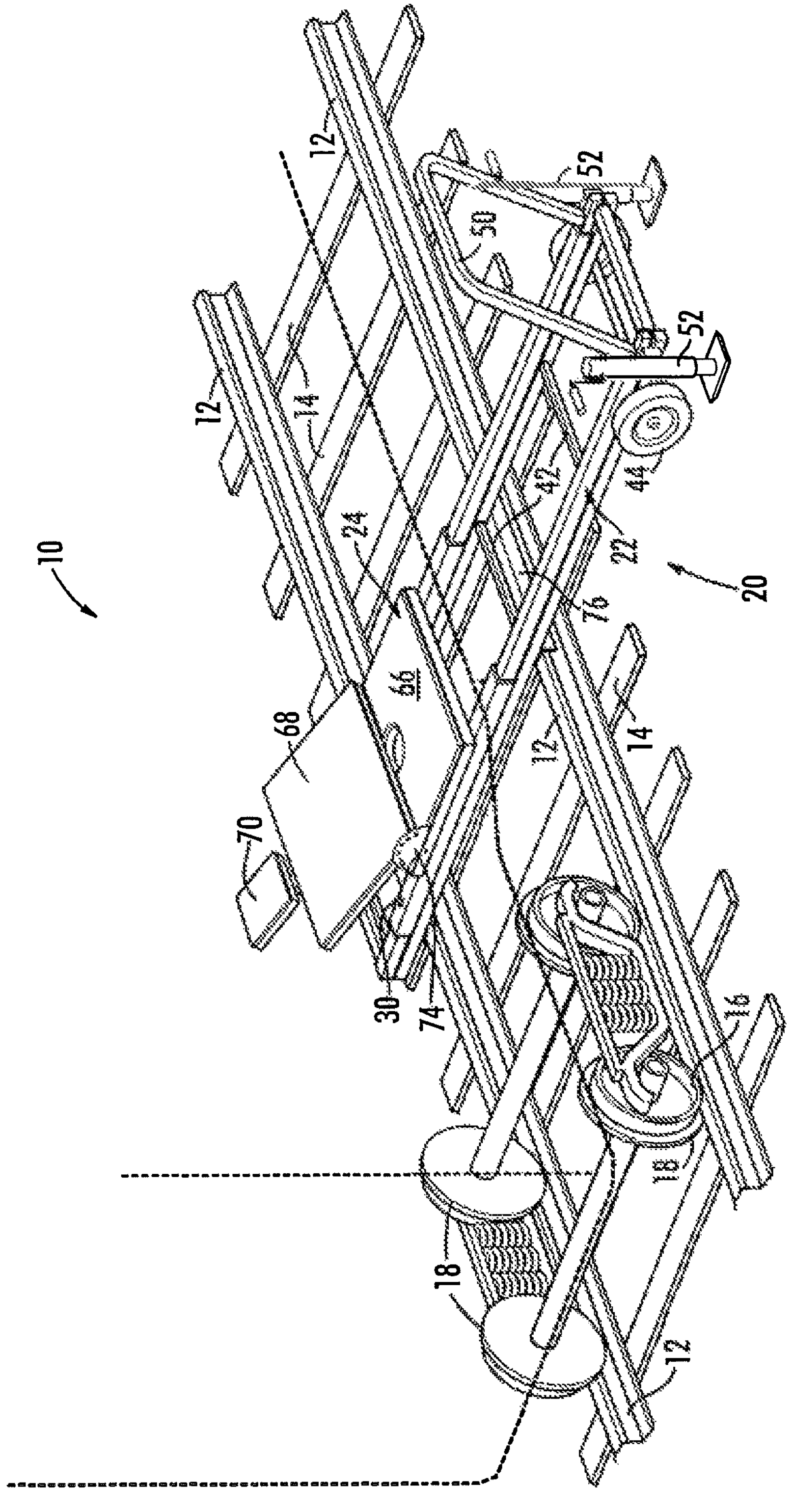
FIG. 1 is a schematic view of an embodiment of the invention.

An embodiment of the invention is illustrated schematically in FIG. 1. In FIG. 1, a railcar, 10, generally illustrated in partial phantom view as a box car but not limited thereto, is on a pair of parallel tracks, or rails, 12, with crossties, 14, spanning there between as is standard with a rail system. The railcar, 10, comprises wheels, 16, which ride on the top of the rail. As is well known the wheels comprise flanges, 18, preferably on the interior, which engage with the side of the track to insure that the wheels roll along the top of the track. The tracks are typically about 56.5" wide but this is based on historical convention. As well known to those of even passing knowledge of train tracks, the combination of a bed of rocks, cross ties which are substantially on top of the bed of rocks and the tracks on top of the cross ties, makes walking and working on a train track a strenuous and dangerous activity.

The creeper, 20, extends across the tracks in a substantially perpendicular relationship to the track. The creeper, which will be more fully explained herein, comprises a frame, 22, with a platform, 24, slidably attached to the platform. A pin, 30, reversible engages with a component of the frame to temporarily prohibit the platform from sliding once it is in a preferred location. A handle, 50, preferably rearward of a set of wheels, 44, allows the front of the creeper to be elevated and rolled on the wheels. A bracket, 76, engages with the track to prohibit the creeper from moving once placed in operative position.

Figure 2:
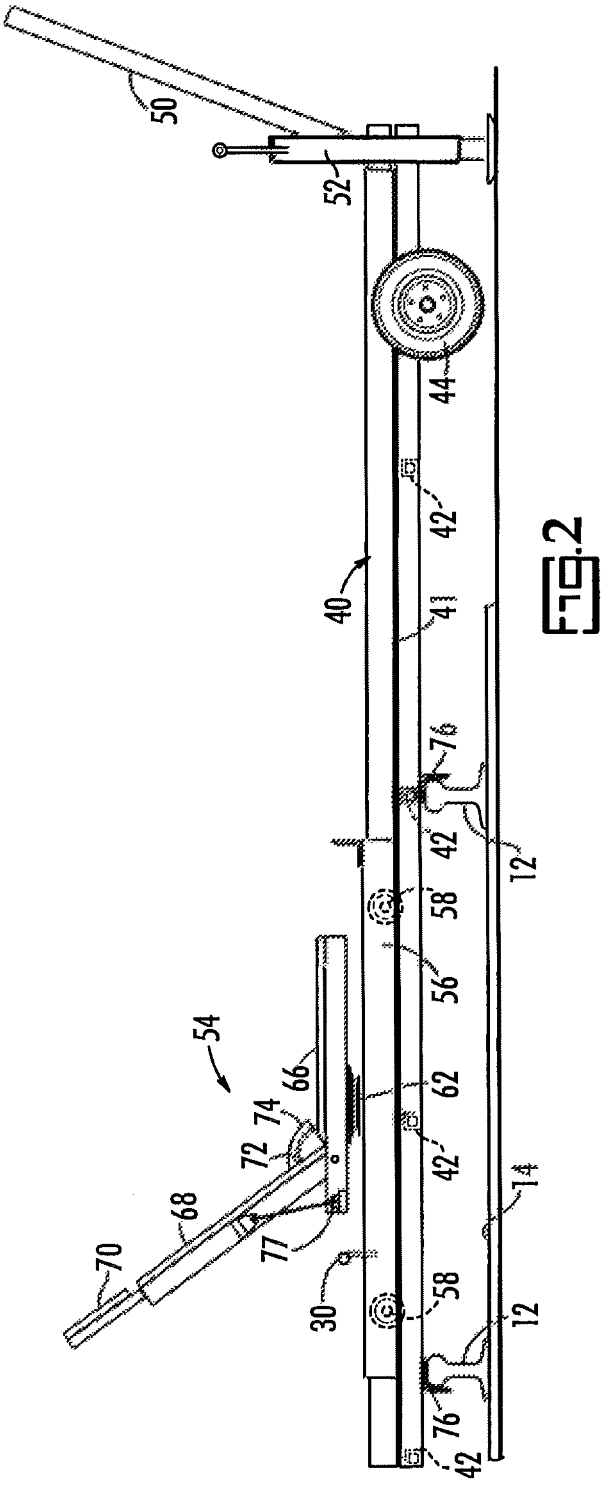
FIG. 2 is a schematic, partial cut-away, side view of an embodiment of the invention.
Figure 3:
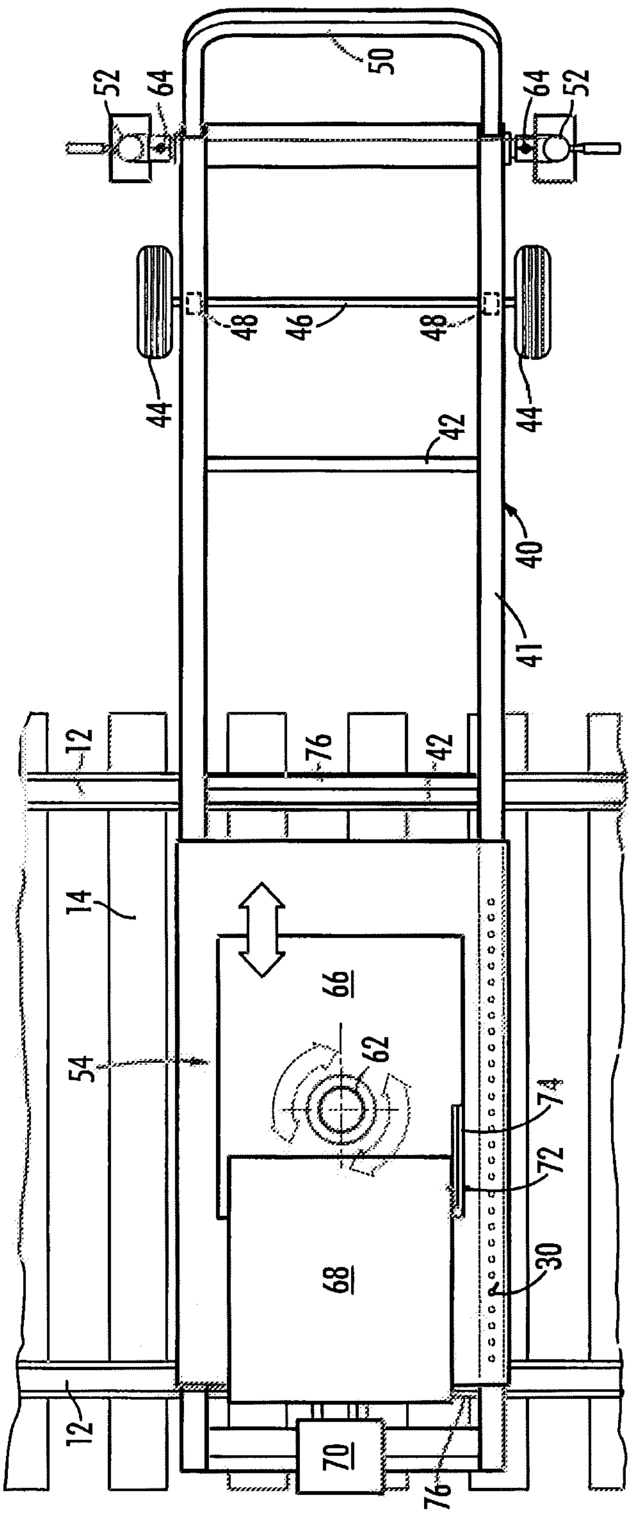
FIG. 3 is a schematic top view of an embodiment of the invention.
Figure 4:
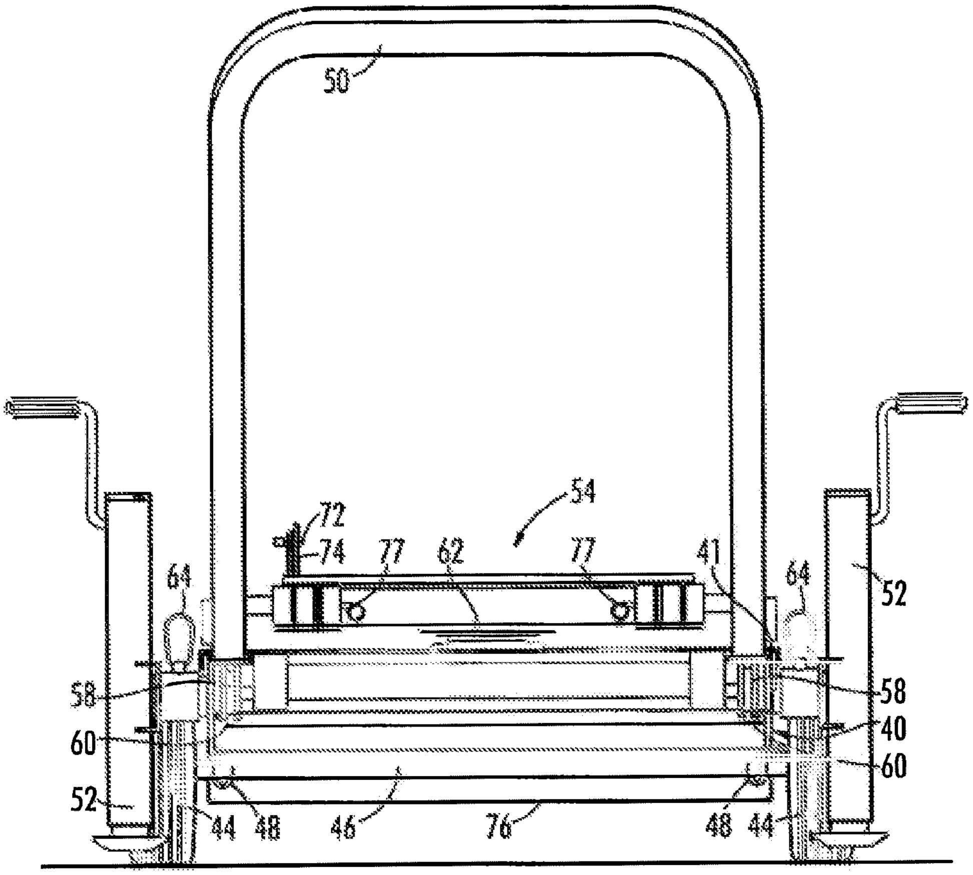
FIG. 4 is a schematic rear view of an embodiment of the invention.

An embodiment of the creeper is illustrated and will be described with reference to FIGS. 2-4. The creeper is illustrated schematically in side view in FIG. 2, in top view in FIG. 3 and in rear view in FIG. 4.

An embodiment of the creeper comprises a rectangular main frame, 40, with side rails, 41, and cross-braces, 42, spanning between the side rails. The side rails and cross-braces are preferably aluminum yet other materials such as steel or composite materials, particularly fiber reinforced composites, may be employed for the side rails and cross-braces. The main frame may be manufactured by welding the components, by threaded members and appropriate brackets or by adhesives, and appropriate brackets, without limit thereto. It is particularly preferred that the side rails and cross-braces are aluminum and they are attached by welding due to the ease of manufacturing and weight considerations.

A pair of wheels, 44, preferably on a common axle, 46, are attached to the main frame to provide mobility. The wheels are preferably attached to the side rails by brackets, 48. Other assemblies such as a wheel and hub assembly can be used in lieu of an axle but these are less preferred due to cost considerations. While not limited thereto, it is preferred to use lock collars on the inside of the wheels to secure the wheels to the axle. The wheels are preferably attached towards the rear of the frame.

A handle, 50, is attached to the main frame, preferably at the side rails, and extends upward there from. It is most preferred that the handle be attached to the main frame at a point which is separated from, and rearward of, the axle thereby allowing the wheels to act as a pivot point as will be more easily understood from further discussion herein.

At least one jack, 52, is attached to the main frame, preferably rearward of the axle. The jack provides stability in use as will be realized from further discussion. The jack, or multiple jacks, is preferably rotatably mounted to the frame such that they can be rotated to a position which is essentially parallel to the frame for transport and substantially perpendicular to the frame when used as a stabilizer. A pin, 64, which is preferably spring loaded, locks the jack into at least one of a substantially perpendicular orientation or a substantially vertical orientation. Substantially perpendicular refers to a position wherein the jack can extend to engage the ground thereby stabilizing the creeper against movement whereas substantially parallel refers to a position wherein the jack is disengaged with the ground thereby allowing the creeper to be moved between locations by rolling on the wheels. The pin is withdrawn to rotate the jack and released to lock the jack in a preferred orientation. Jacks with spring loaded pins are commercially available through a variety of sources.

A platform, 54, is slidably mounted to the main frame. In one embodiment the platform is attached to a roller platform, 56. The roller platform, 56, moves parallel to the frame. In one embodiment the roller platform has rollers, 58, which roll on a track, 60, preferably attached to the main frame and preferably at the side rails.

The platform, 54, is preferably rotatably attached to the roller platform, 56, by a turntable, 62. The turntable allows the platform to rotate relative to the frame thereby increasing the range of reach available to the personnel using the creeper. The platform preferably comprises a seat, 66, and a back, 68, wherein the back is pivotally mounted, preferably, to the seat. An optional but preferred head rest, 70, is provided for comfort. A pin, 72, which is preferably spring loaded and biased for engaging with a protractor bracket, 74, is preferred for securing the back at a predetermined angle. A gas strut, 77, is mounted between the back and seat and biased toward extension. In use, the personnel can sit on the seat, pull the pin, 72, against the bias of the spring if necessary and allow the gas strut to persuade the back into a decreasing angle relative to the seat. When the proper angle is reached the spring loaded pin is released thereby reversibly securing the back at the desired angle relative to the seat. A removable pin, which is preferably tethered can be used. To lower the seat the personnel pulls the pin while allowing their weight to persuade the back towards a parallel arrangement with the seat against the persuasion of the gas strut. A pin, 30, engages temporarily locks the platform in a location along the frame. The pin, 30, may be spring loaded.

Rail brackets, 76, are preferably attached to the bottom of the frame and separated approximately the width rf the outside of standard rails.

In use, the jacks are secured in a position which is parallel to the frame or at least to a position which will allow the creeper to be moved by rolling the creeper on the wheels. The platform back is positioned to be approximately parallel to the seat. The creeper is driven by engaging the handle. Downward pressure is applied to the handle thereby lifting the front of the creeper off of the ground such that the weight of the creeper is supported by the wheels. The creeper is then rolled under a rail car to a position where the rail brackets are engaged with the rail thereby prohibiting rolling in a direction which is perpendicular to the rails. The pressure is removed from the handle thereby allowing the front of the creeper to drop onto the rails. The jacks are then rotated to a position for engagement with the ground, which is preferably about perpendicular with the frame, and extended to place the creeper in an engaging relationship with the rails wherein the rail brackets are either both inside the rails or both outside the rails. The creeper is therefore engaged with the rails on the front and the ground, via the jacks, in the back thereby prohibiting motion. The personnel than lays on the platform and rolls the platform under the rail car to a suitable position to perform the desired function. If necessary the platform can be rotated on the turntable or the back can be raise thereby allowing the personnel to work in a sitting position instead of laying down. Once the operation is complete the process is reversed thereby removing the creeper from under the rail car.

Additional components and accessories can be incorporated into the creeper. Tool trays, drink holders, grounding straps, and the like may be incorporated into the creeper for convenience and functionality.

The invention has been described with reference to the preferred embodiments without limit thereto. One of skill in the art will appreciate additional limitations and alterations which are not specifically set forth but which are within the scope of the invention as more clearly set forth in the claims appended hereto.

The invention claimed is:

1. A creeper adapted for operation under a railcar comprising:
- a main frame comprising a front and a rear, said main frame further comprising:
  - wheels attached at said rear of said main frame; and
  - a handle attached at said rear of said main frame and extending upward, said handle for driving said creeper;
- a roller platform comprising a turntable, said roller platform slidably attached to said main frame; and
- a platform rotatably attached to said roller platform above said turntable.

2. The creeper of claim 1 further comprising rail engagement brackets attached to said main frame forward of said wheels.

3. The creeper of claim 1 wherein said platform comprises a seat and a back wherein said back is pivotally attached to said seat.

4. The creeper of claim 3 further comprising a gas strut between said seat and said back wherein said gas strut is biased to persuade said back towards an upright perpendicular orientation relative to said seat.

5. The creeper of claim 3 further comprising a protractor bracket capable of reversibly fixing said back at a fixed angle relative to said seat.

6. The creeper of claim 5 wherein said protractor bracket further comprises a pin for reversible fixing said back at said fixed angle relative to said seat.

7. The creeper of claim 6 wherein said pin is spring loaded.

8. The creeper of claim 1 wherein said main frame comprises side rails and cross-braces.

9. The creeper of claim 1 further comprising at least one jack capable of reversibly engaging with a ground surface to stabilize said creeper against movement.

10. The creeper of claim 9 wherein said jack is rotatably attached to said main frame.

11. A creeper for operation beneath a railcar, comprising:

a main frame having a front section and a rear section;

wheels attached to said rear of said main frame for roller movement of said creeper;

a generally U-shaped handle attached to said rear of said main frame and extending upward from said main frame; said handle for driving said creeper;

a roller platform slidably attached to said main frame;

a seat rotatably mounted on said roller platform;

a back pivotally attached to said seat for movement between an upright position and a folded position immediately above said seat.

* * * * *